United States Patent
Kawamata et al.

(10) Patent No.: US 6,820,259 B1
(45) Date of Patent: Nov. 16, 2004

(54) SOFTWARE DISTRIBUTION SYSTEM AND SOFTWARE RECEIVING TERMINAL APPARATUS

(75) Inventors: Yukihiro Kawamata, Hitachi (JP); Kimiya Yamaashi, Hitachi (JP); Masato Horita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 09/648,451

(22) Filed: Aug. 28, 2000

(30) Foreign Application Priority Data

Aug. 31, 1999 (JP) .......................................... 11-244787

(51) Int. Cl.[7] .............................................. G06F 9/44
(52) U.S. Cl. ...................................................... 717/173
(58) Field of Search .............................. 717/168–178; 725/63, 74

(56) References Cited

U.S. PATENT DOCUMENTS

| | | | | |
|---|---|---|---|---|
| 6,115,549 A | * | 9/2000 | Janis et al. | 717/172 |
| 6,199,204 B1 | * | 3/2001 | Donohue | 717/178 |
| 6,230,098 B1 | * | 5/2001 | Ando et al. | 701/208 |
| 6,378,127 B1 | * | 4/2002 | Delo | 717/174 |
| 6,499,109 B1 | * | 12/2002 | Balasubramaniam et al. | 713/201 |

FOREIGN PATENT DOCUMENTS

JP 09218788 A * 8/1997 ........... G06F/9/445

OTHER PUBLICATIONS

JP–A–11–98477, Apr. 1999, Japan, Yuiko et al., Feb. 14, 2003.*
EP–0926862A, Jun. 1999, Europe, Karibe, et al.*

* cited by examiner

*Primary Examiner*—Todd Ingberg
*Assistant Examiner*—Lawrence Shrader
(74) *Attorney, Agent, or Firm*—Antonelli, Terry, Stout & Kraus, LLP

(57) ABSTRACT

A terminal apparatus has a reception unit for receiving a data group or a program group distributed from a satellite or a ground distribution system, and an update sequence management unit. The update sequence management unit searches data or a program of the terminal apparatus to be updated and data or a program necessary for updating the data or the program of the terminal apparatus, from the data group or the program group, determines an update sequence of the searched program or data, and updates the program or data of the terminal apparatus in accordance with the determined update sequence.

4 Claims, 19 Drawing Sheets

FIG.7

SOFTWARE DISTRIBUTION LIST 700

| DISTRIBU-TION TIME (NUMBER) 705 | SOFTWARE NAME (DATA SIZE: KB) 715 | INSTALLA-TION TYPE 720 | SOFTWARE NAME/VER. BEFORE UPDATE 725 | SOFTWARE NAME/VER. AFTER UPDATE 730 | COMPATI-BLE APPARATUS 735 | COMPATIBLE SOFTWARE 740 |
|---|---|---|---|---|---|---|
| 10:10:00 (1) | INTERNET BROWSER VER.1.0(3240) | NEW | — | — | Navi3000 Navi2000 | — |
| 10:11:00 (2) | 3D VIEWER PLUG-IN (1240) | NEW | — | — | Navi3000 Navi2000 | NAVIGATOR, VER.2.0 OR HIGHER |
| 10:12:00 (3) | VOICE GUIDE PLUG-IN (2210) | NEW | — | — | Navi3000 Navi2000 | NAVIGATOR, VER.4.0 OR HIGHER |
| 10:13:00 (4) | MAP DATA (99 VERSION) (35200) | NEW | — | — | Navi3000 Navi2000 | NAVIGATOR, VER.4.0 OR HIGHER |
| 10:14:00 (5) | DRIVER UP-DATA VER.5.0(2170) | UPDATE | NAVI DRIVER VER.4.0 | NAVI DRIVER VER.5.0 | Navi3000 | — |
| 10:15:00 (6) | NAVIGATOR UP-DATA VER.5.0(1950) | UPDATE | NAVIGATOR VER.4.0 | NAVIGATOR VER.5.0 | Navi3000 | NAVI DRIVER VER.5.0 |
| 10:16:00 (7) | DRIVER UP-DATA VER.4.0(1830) | UPDATE | NAVI DRIVER VER.3.0 | NAVI DRIVER VER.4.0 | Navi3000 Navi2000 | — |
| 10:17:00 (8) | NAVIGATOR UP-DATA VER.4.0(1760) | UPDATE | NAVIGATOR VER.3.0 | NAVIGATOR VER.4.0 | Navi3000 Navi2000 | NAVI DRIVER VER.4.0 |
| 10:18:00 (9) | DRIVER UP-DATA VER.3.0(1320) | UPDATE | NAVI DRIVER VER.2.0 | NAVI DRIVER VER.3.0 | Navi3000 Navi2000 | — |
| 10:19:00 (10) | NAVIGATOR UP-DATA VER.3.0(1570) | UPDATE | NAVIGATOR VER.2.0 | NAVIGATOR VER.3.0 | Navi3000 Navi2000 | NAVI DRIVER VER.3.0 |
| 10:20:00 (11) | DRIVER UP-DATA VER.2.0(1680) | UPDATE | NAVI DRIVER VER.1.0 | NAVI DRIVER VER.2.0 | Navi3000 Navi2000 | — |
| 10:21:00 (12) | NAVIGATOR UP-DATA VER.2.0(1870) | UPDATE | NAVIGATOR VER.1.0 | NAVIGATOR VER.2.0 | Navi3000 Navi2000 | NAVI DRIVER VER.2.0 |

FIG.8

| | TERMINAL INFORMATION TABLE | |
|---|---|---|
| 805 — | NAVI TYPE NUMBER | Navi 2000 |
| 810 — | APPLICATION | NAVIGATOR 2.0 |
| 815 — | DRIVER | NAVI DRIVER 3.0 |
| 820 — | PLUG-IN | 3D VIEWER PLUG-IN |
| 825 — | MAP DATA | COUNTRY MAP ('98 VERSION) |

INSTALLATION SEQUENCE TABLE

| INSTALLATION ORDER | SOFTWARE NAME |
|---|---|
| 1ST | "INTERNET BROWSER VER. 1.0" |
| 2ND | "DRIVER UP-DATA VER. 4.0" |
| 3RD | "NAVIGATOR UP-DATA VER. 3.0" |
| 4TH | "NAVIGATOR UP-DATA VER. 4.0" |
| 5TH | "VOICE GUIDE PLUG-IN" |
| 6TH | "MAP DATA 99' VERSION" |

SOFTWARE DISTRIBUTION SYSTEM AND SOFTWARE RECEIVING TERMINAL APPARATUS

BACKGROUND OF THE INVENTION

The present invention relates to a distribution system for distributing data or programs and a receiving terminal apparatus for receiving distributed data or programs, respectively via a satellite or a ground station.

Conventionally, distribution of data or programs (hereinafter described as software) is generally conducted by using storage media. Generally, a user installs distributed software by using storage media. If software can be automatically updated (including installation of new software), it is very convenient. In addition, without particular knowledge, new software can be updated and many people can use latest software.

Techniques regarding renewal of software is disclosed, for example, in JP-A-11-98477.

SUMMARY OF THE INVENTION

If all of distributed software received at a receiving terminal apparatus can be automatically updated simply in the reception order of software, the process at the receiving terminal apparatus is easy. However, in this case, data or programs which are required not to be altered may be installed during update. Problems such as an inability of using the terminal apparatus may occur.

If a user is required to check distributed data or programs and determine the data or programs used for update and the update sequence, highly sophisticated technical knowledge is necessary and a work load is required.

It is an object of the present invention to provide a distribution system capable of correctly and easily updating software.

It is another object of the present invention to provide a terminal apparatus capable of easily executing a necessary update process in accordance with distributed software.

According to one aspect of the present invention, the contents of data or programs and installation condition data are distributed separately from distribution of data or programs.

According to another aspect of the present invention, distributed data or a program is checked whether it is required to be updated, and distributed data or program used for update are selected from distributed data and programs. After the update sequence of distributed data and programs is determined, they are updated. In this manner, a terminal apparatus easy to use can be provided.

BRIEF DESCRIPTION OF THE DRAWINGS

FIG. 7 shows a list of software distributed from the station of the first embodiment.

FIG. 8 is a terminal information table of the terminal apparatus of the first embodiment.

FIG. 11 is an installation sequence table according to the first embodiment.

DETAILED DESCRIPTION OF THE EMBODIMENTS

Figure 1:
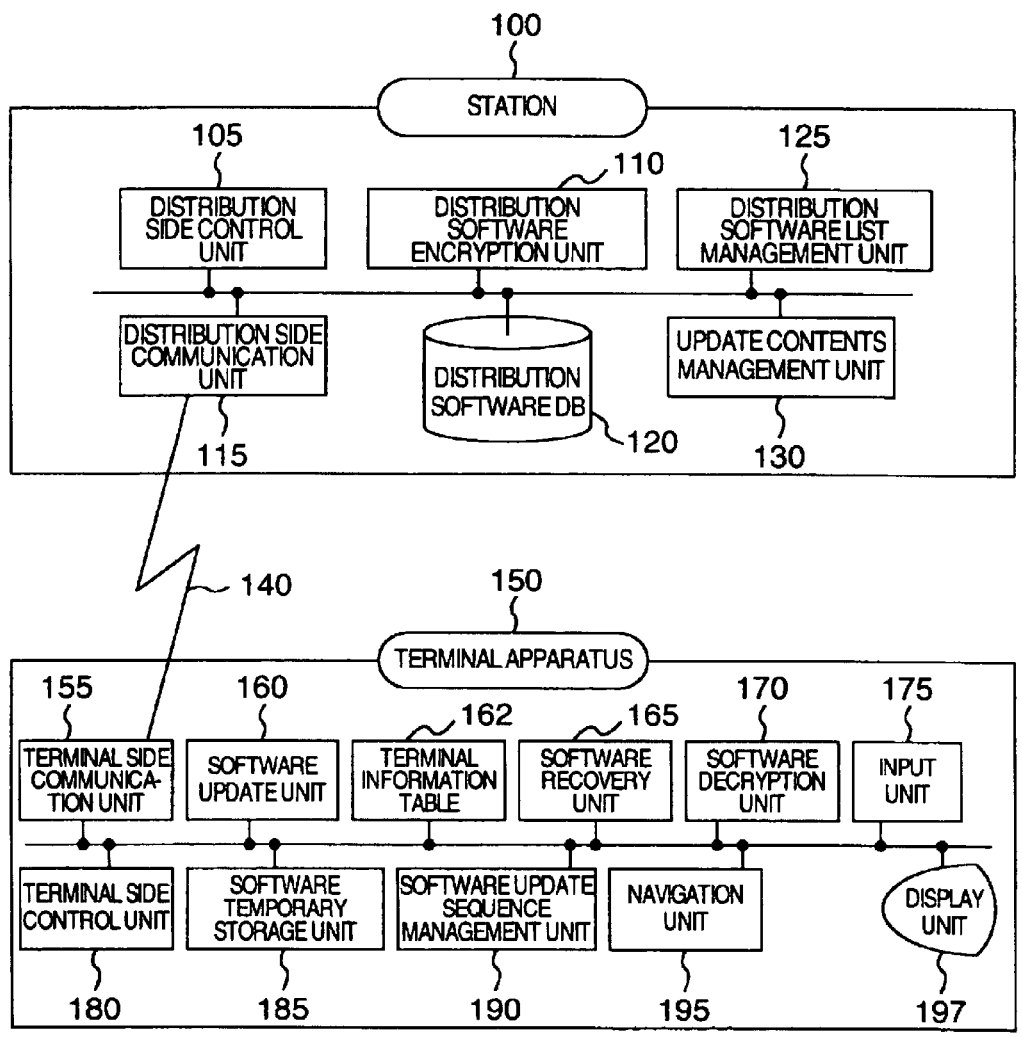
FIG. 1 is a diagram showing the structure of a system according to a first embodiment of the invention.

The first embodiment of this invention will be described with reference to FIGS. 1 to 11. FIG. 1 is a diagram showing the structure of a system according to the first embodiment. The system of this embodiment is constituted of a terminal apparatus 150 and a station 100 which distributes data or programs to the terminal apparatus 150. Although the terminal apparatus for receiving data or programs may be mounted on a fixed facility, in this embodiment it is assumed that the terminal apparatus is mounted on a mobile unit. As an example of such a mobile unit, vehicles distributed in a broad area are used by way of example. The terminal apparatus may not be movable, and not only the vehicles but also other various mobile units may be used such as those used for overland transport and marine transport, and air planes.

Although a variety of apparatuses may be used as the terminal apparatus of the mobile unit, a typical example, a terminal apparatus with a car navigation function, is used in the following description.

Although there are many available media for distributing data or programs (hereinafter described as software) to be distributed, the system is assumed to use a satellite.

Either a geostationary satellite or a mobile satellite may be used. In Japan, a geostationary satellite has a small angle of incidence so that buildings and geographical features greatly influence communications. The angle of incidence of a mobile satellite is determined by its orbit. By properly selecting an orbit, the mobile satellite can move along an orbit just above Japan. In this case, radio waves can be transmitted along a zenith direction.

The system shown in FIG. 1 distributes software by using a satellite as described above. The terminal apparatus 150 with a car navigation function receives distributed software and updates by itself software already possessed by the apparatus.

This system has: the station 100 for distributing software to the terminal apparatus 150; and the apparatus 150 for receiving distributed software, the apparatus having a function of updating software possessed by the apparatus.

The station 100 has: a distribution side communication unit 115 for distributing software to update software possessed by the terminal apparatus 150 and distributing a list of software to be distributed; a distribution software database 120 for storing distribution software; an encryption unit 110 for enciphering software before it is distributed to the terminal apparatus 150; a distribution software list management unit 125 for managing a distribution software list described with the names and distribution time of distribution software; an update contents management unit 130 for managing the update contents of software possessed by the terminal apparatus 150; and a distribution side control unit 105 for issuing a distribution command to the distribution side communication unit 115, issuing an encryption command to the software encryption unit 110 and managing the whole control flow.

The terminal apparatus 150 has: a navigation unit 195 for searching necessary map information, displaying a map, and displaying a present location of the user; a software update unit 160 for updating software of the navigation unit 195; a terminal side communication unit 155 for receiving software and a distribution software list distributed from the station 100; a software temporary storage unit 185 for temporarily storing software received at the terminal side communication unit 155; a software recovery unit 165 for recovering the original software of the navigation unit 195 once updated by the software update unit 160; an update sequence management unit 190 for selecting software or software group required to be updated, from the distribution software list sent from the station 100, and managing the update order of the selected software or software group; a decryption unit 170 for deciphering software distributed from the station 100; an input unit 175 for inputting a decryption key necessary for deciphering software at the decryption unit 170; a display unit 197 for displaying map information or search information; and a terminal side control unit 180 for issuing a software update command to the software update unit 160, issuing a software recovery command to the software recovery unit 170, and issuing an update sequence command to the update sequence management unit 190.

Figure 2:
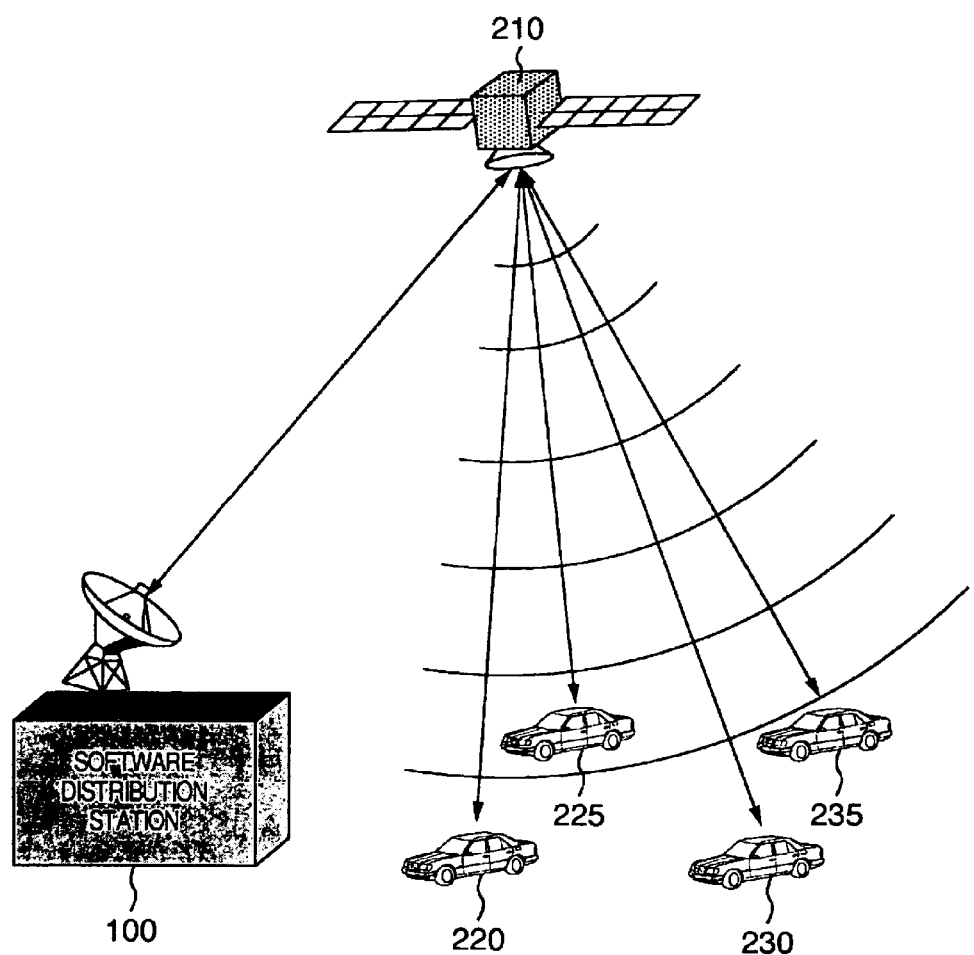
FIG. 2 is a diagram showing the structure of the system of the first embodiment.

FIG. 2 illustrates how software is distributed from the station 100 to the terminal apparatus in the vehicle. The station 100 distributes software and a distribution software list to a number of vehicles (vehicles 220, 225, 230 and 235) via an artificial satellite, e.g., a super ellipsoidal orbit satellite 210. The vehicles 220, 225, 230 and 235 transmit update contents to the station via the super ellipsoidal orbit satellite 210.

The super ellipsoidal orbit satellite 210 moves along an orbit (angle of incidence: 70° or larger) so that the vehicles 220, 225, 230 and 235 can see the super ellipsoidal orbit satellite 210 in the zenith direction. By using such a satellite for software distribution, it becomes possible to prevent communication between the vehicles and satellite 210 from being interfered by high architectures such as buildings. Since only direct waves from the satellite are received, it is possible to suppress the influence of reflected waves which generate noises.

An example shown in FIG. 2 is most preferable. However, the embodiment is also applicable to the environments that the angle of incidence of the satellite 210 is low, there are obstacles in the communication paths, or reflected waves, or radio waves are transmitted via an intermediary.

Figure 3:
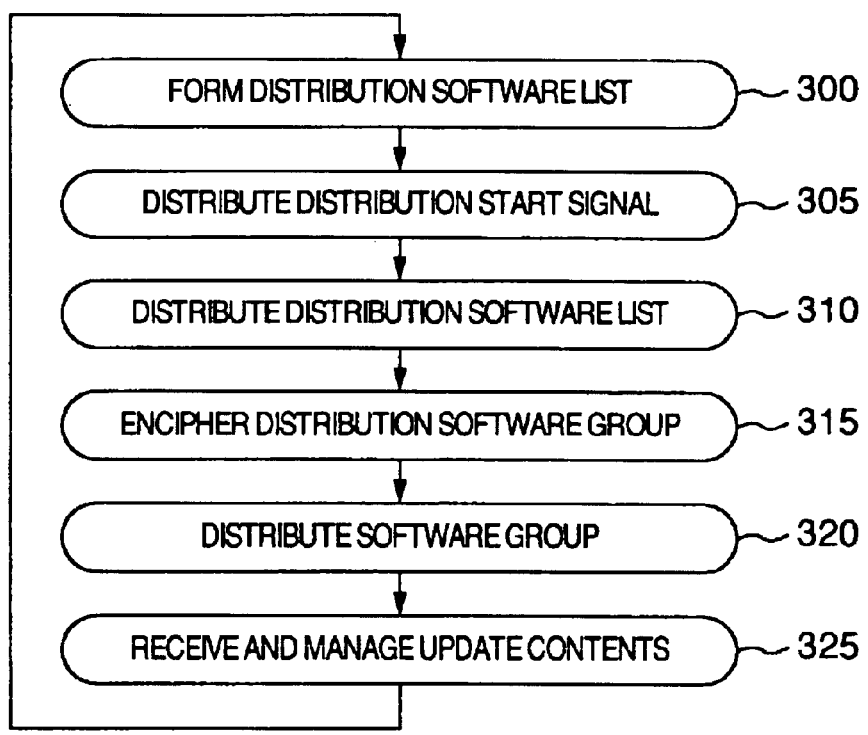
FIG. 3 is a flow chart illustrating the operation to be executed by a station of the first embodiment.
Figure 4:
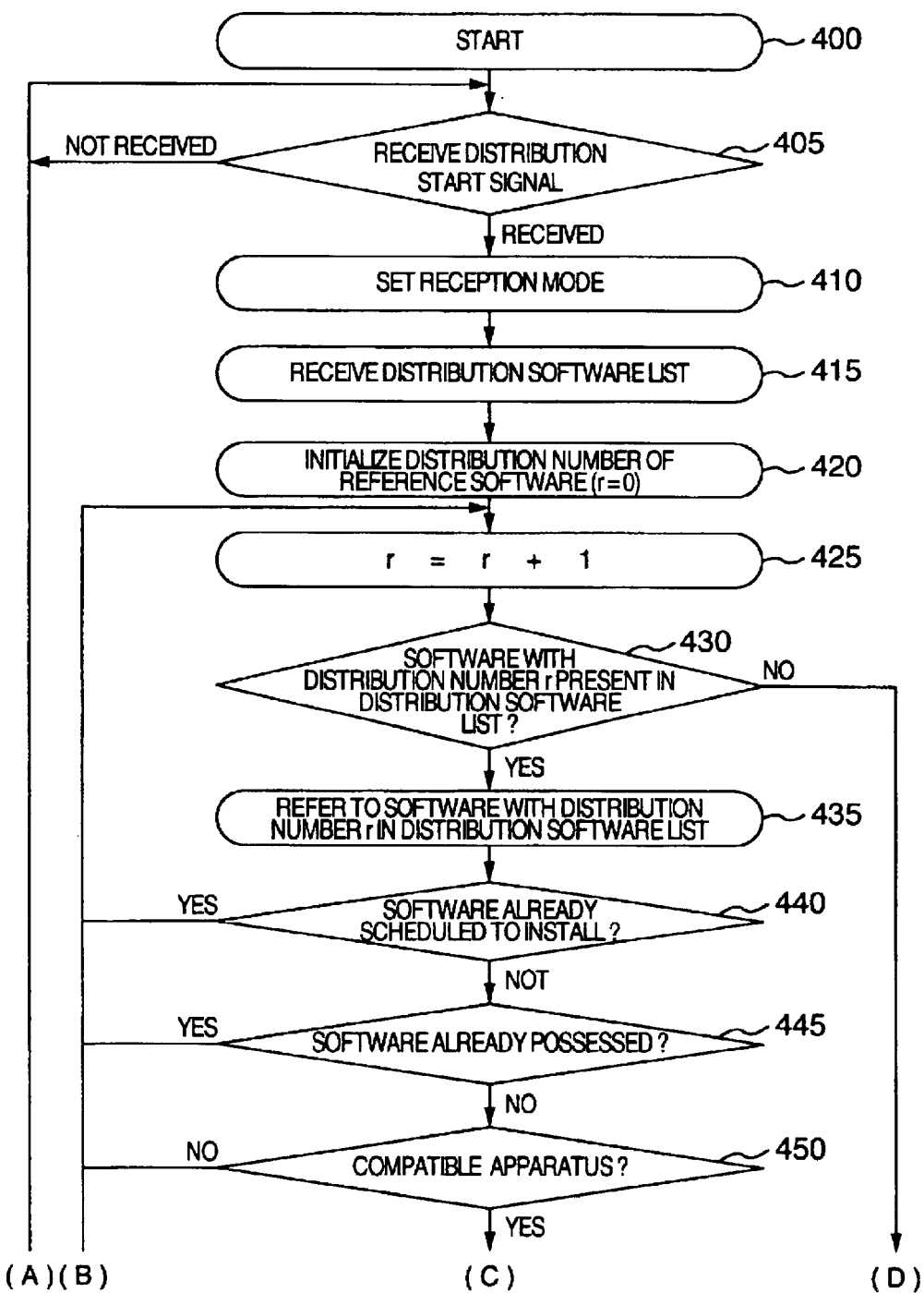
FIG. 4 is a flow chart illustrating the operation to be executed by a terminal apparatus of the first embodiment.
Figure 5:
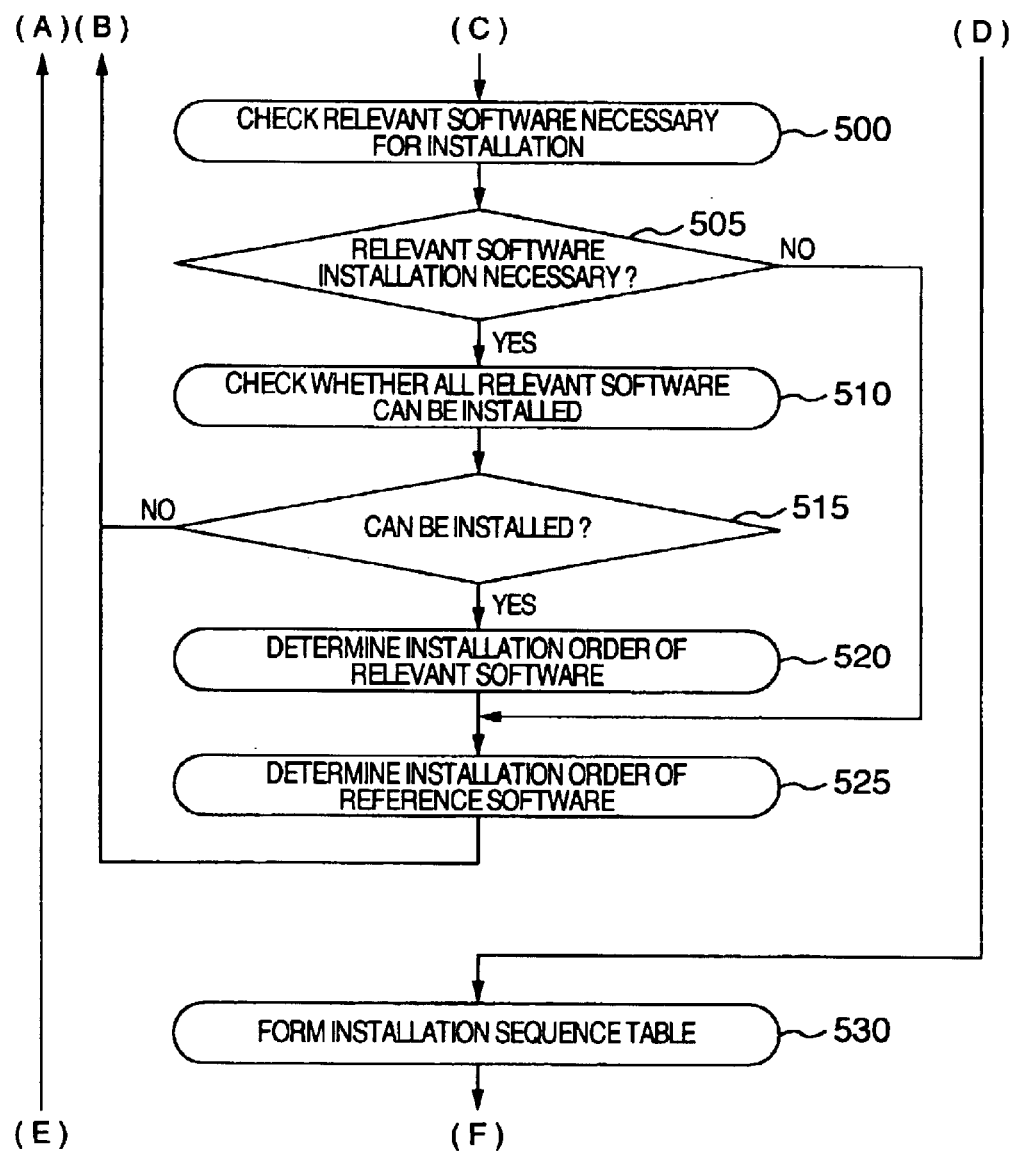
FIG. 5 is a flow chart illustrating the operation to be executed by the terminal apparatus of the first embodiment.
Figure 6:
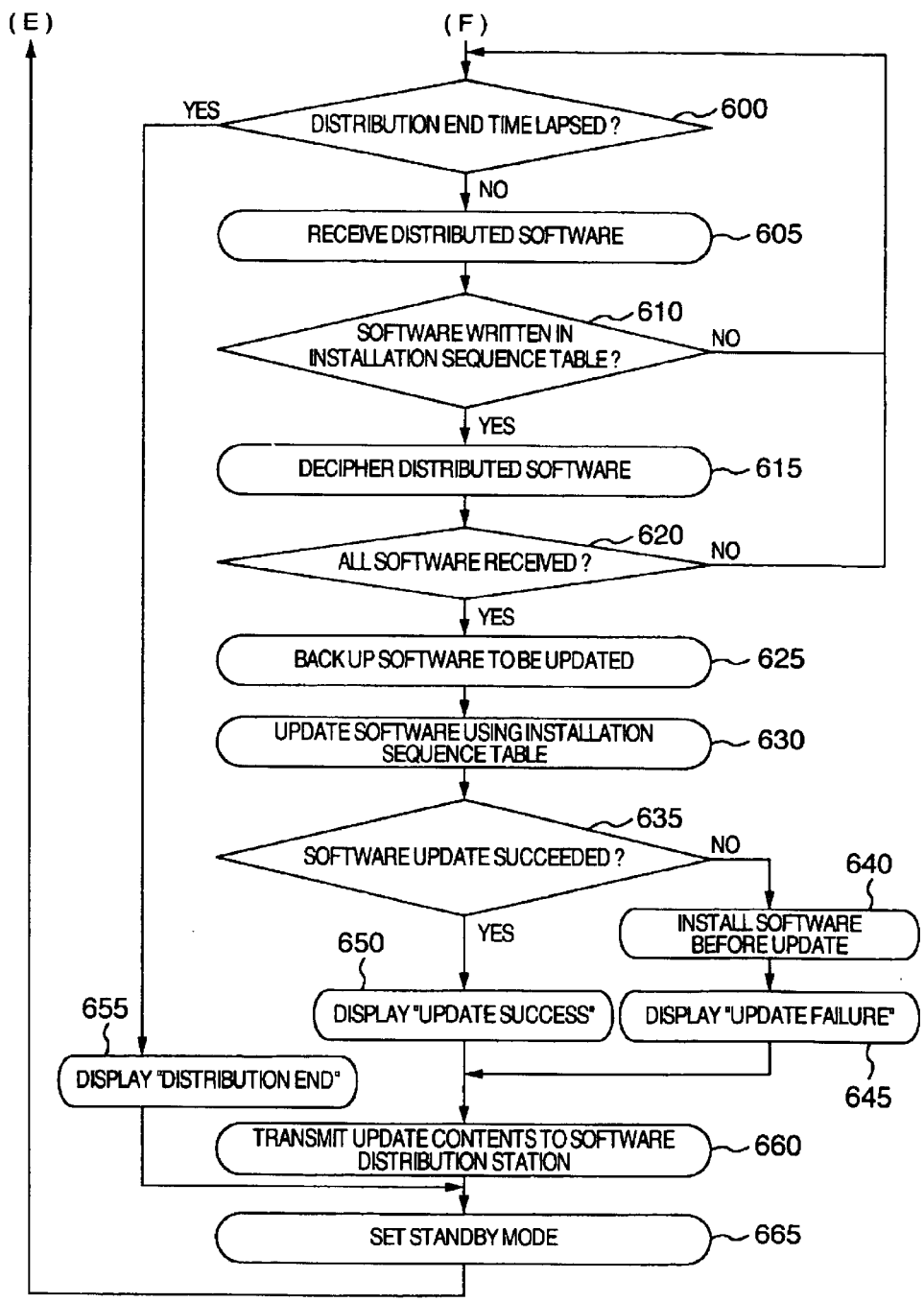
FIG. 6 is a flow chart illustrating the operation to be executed by the terminal apparatus of the first embodiment.

FIGS. 3 to 6 are flow charts illustrating the operation of the first embodiment. The flow chart of FIG. 3 illustrates the operation of the station 100, and the flow charts of FIGS. 4 to 6 illustrate the operation of the terminal apparatus 150.

At Step 300 shown in FIG. 3, the distribution list management unit 125 forms a distribution software list describing therein the distribution contents of a software and distribution schedule, the list being distributed from the station 100. In forming the distribution software list, the distribution list management unit 125 inquires version information of a software group stored in the distribution software database 120 and determines a distribution time in accordance with each of stored software. An example of the distribution software list is shown in FIG. 7.

Next, at Step 305 the distribution side communication unit 115 transmits a distribution start signal for 30 seconds to a number of terminal apparatuses 150 in the vehicles, to thereafter follow Step 310. This distribution start signal is transmitted in response to a command from the distribution side control unit 105 which uses a predetermined schedule.

On the side of the terminal apparatus 150, at Step 400 shown in FIG. 4 if the terminal apparatus 150 is not used, a standby mode is entered in order to lower a power consumption of the terminal apparatus 150. The standby mode is a mode in which the frequency of control clocks is lowered to lower the execution speed of a command and suppress the power consumption and hence heat generation.

If the terminal apparatus 150 is in use for another purpose, the apparatus 150 operates for that purpose. For example, at Step 400 the terminal apparatus 150 may be in use for navigation by using the navigation unit 195 and display unit 197. If the terminal apparatus has another function, it may be in use for this function.

Figure 19:
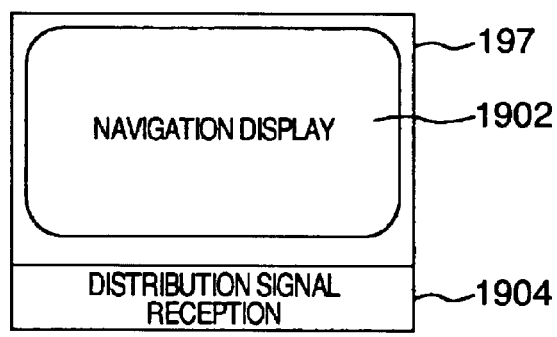
FIG. 19 is a display window used when a distribution start signal is received.

After the distribution start signal is transmitted from the station 100 at Step 305, it is checked at Step 405 whether the terminal communication unit 155 has received the distribution start signal. If received, at Step 410 the terminal side control unit 180 sets a reception mode so that the software group and distribution software list to be distributed can be received. FIG. 19 shows a display window of the display unit 197 used when the terminal apparatus 150 is used for the navigation purpose. After a reception of the distribution start signal is detected at Step 405, as shown in FIG. 19, information indicating a reception of the distribution start signal is displayed in a display area 1904 under a navigation display area 1902.

If there is no distribution from the station 100 and no distribution start signal is received at Step 405, then the standby mode continues or the terminal apparatus operates for its function to wait for the distribution start signal at Step 405.

On the side of the station 100, at Step 310 the distribution side communication unit 115 distributes the distribution software list formed by the distribution software list management unit 125 to the terminal apparatus 150 to thereafter follow Step 315.

Figure 20:
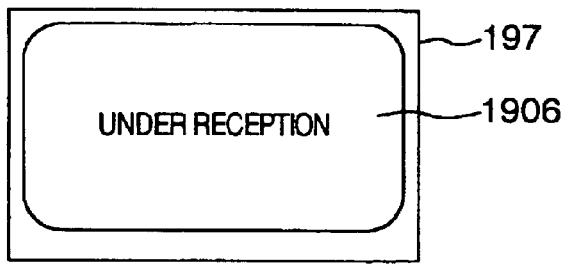
FIG. 20 is a display window used while distributed software is received.

On the side of the terminal apparatus 150, at Step 415 the terminal side communication unit 155 receives the distribution software list distributed from the station 100 to thereafter follow Step 420. When the list is received at Step 415, a display window shown in FIG. 20 appears and the navigation function is stopped to receive distribution software.

From Step 420 to Step 525, the update sequence management unit 190 selects software to be installed and checks an installation sequence.

At Step 420 the terminal side control unit 180 initializes a distribution number r of reference software in the received distribution software list, to r=0.

The distribution software list will be described. FIG. 7 shows a distribution software list 700 distributed from the station 100. The distribution software list 700 stores therein: a distribution time 705 of each piece of software; a software number 710 sequentially and uniquely assigned to each piece of software, starting from "1"; a name 715 of distribution software; an installation type 720 indicating whether the software is update software or new software; a name (including a version) 725 of software updated by distribution software (up-data); a name (including a version) 730 of software to be updated by distribution software (up-data); an apparatus 735 compatible with installation software; and compatible software 740.

At Step 425 the terminal side control unit 180 increments the distribution number r of the reference software in the received distribution software list by "1". Next, at Step 430 the terminal side control unit 180 checks whether the distribution software list contains software having the distribution number r, in order to confirm whether all software in the distribution software list has been referred to. If the distribution software list contains software having the distribution number r, i.e., if all software in the distribution software list is not still referred to, then the flow advances to Step 435, whereas if the distribution software list does not contain software having the distribution number r, i.e., if all software in the distribution software list has been referred to, then the flow advances to Step 600.

At Step 435, the update sequence management unit 190 refers to the software having the distribution number r in the distribution software list. At Step 440 the update sequence management unit 190 checks whether the reference software having the distribution number r is software already scheduled to install. If it is the software already scheduled to install, the flow returns to Step 425, whereas if not, the flow advances to Step 445. At Step 445 the update sequence management unit 190 checks whether the reference software is already possessed or not, by referring to the terminal information table 162 and checking whether the table contains software having the same name.

The terminal information table 162 will be described. FIG. 8 shows a terminal information table 162. The terminal information table 162 stores therein: a navi type number 805 representative of a type number of the terminal apparatus 150; an application name (including a version) 810 of an application possessed by the terminal apparatus 150; a driver name (including a version) 815 of a driver possessed by the terminal apparatus 150; a plug-in name (including a version) 820 of a plug-in possessed by the terminal apparatus 150; and a map data name (including a version) 825 of map data possessed by the terminal apparatus 150.

If it is determined at Step 445 that the reference software has been possessed already, the flow returns to Step 425, whereas if it is determined that the reference software is not still possessed, the flow advances to Step 450.

At Step 450 the update sequence management unit 190 checks whether the reference software is compatible with the terminal apparatus 150, by referring to the compatible apparatus 735 in the distribution software list and the navi type number 805 in the terminal information table 162. If the software is compatible with the terminal apparatus 150, the flow advances to Step 500, whereas if not, the flow returns to Step 425.

From Step 500 to Step 525, the update sequence management unit 190 extracts relevant software necessary for installing the reference software and determines the installation order of the reference software and relevant software.

Figure 9:
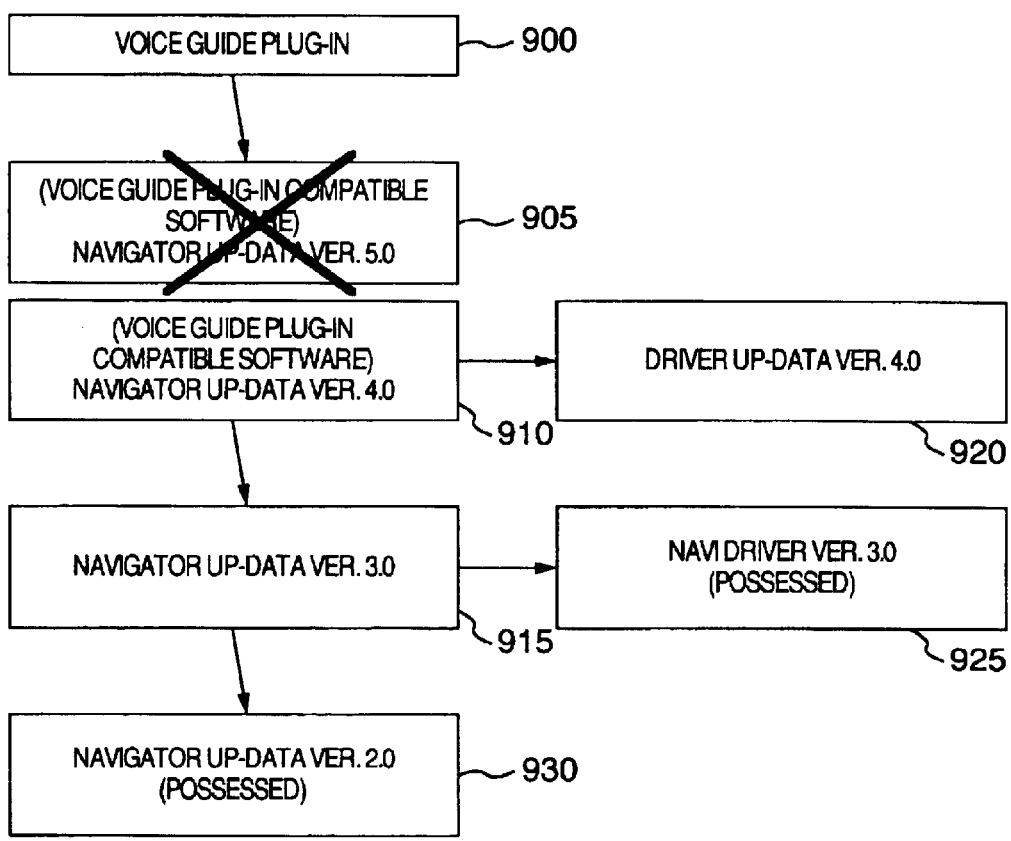
FIG. 9 is a diagram showing an extraction sequence for software relevant to the software possessed by the terminal apparatus of the first embodiment.

A method of extracting relevant software will be described. The relevant software is a software group necessary for installing the reference software. Consider now, for example, the case wherein software "voice guide plug-in" in the distribution software list 700 is installed. FIG. 9 illustrates an example of extracting relevant software necessary for installing the software "voice guide plug-in". In installing software "voice guide plug-in" 900, compatible software necessary for running the "voice guide plug-in" 900 is checked by referring to the terminal information table 162 and checking whether the compatible software is already possessed. If it is already possessed, it is not necessary to install the relevant software, whereas if not possessed, the present software is required to be changed to the compatible software with version-up. Therefore, in order to search up-data for version-up, the compatible software is detected from the software name 730 after update in the distribution software list 700. The compatible software "navigator Ver. 4.0 or higher" for the "voice guide plug-in" 900 is not written in the terminal information table 162. Therefore, from the software name 730 after update in the distribution software list 700, software "navigator Ver. 5.0" and "navigator Ver. 4.0" is detected.

Software necessary for updating to "navigator Ver. 5.0" is "navigator up-data Ver. 5.0", 905 and software necessary for updating to "navigator Ver. 4.0" is "navigator up-data Ver. 4.0" 910. It is checked whether these pieces of software 905 and 910 can be installed or not. First, compatible apparatuses with the software "navigator up-data Ver. 5.0" 905 and "navigator up-data Ver. 4.0" 910 are checked. Since the compatible apparatus with "navigator up-data Ver. 5.0" is "Navi3000", this software cannot be installed. Since the compatible apparatus with "navigator up-data Ver. 4.0" is either "Navi3000" or "Navi2000", this software can be installed. Next, the compatible software with "navigator up-data Ver. 4.0" 910 is checked. From the distribution software list 700, it can be understood that the compatible software with "navigator up-data Ver. 4.0" 910 is "navi driver Ver. 4.0". It is checked from the terminal information table 162 whether the navi driver Ver. 4.0" is already possessed. Since the driver "navi driver Ver. 4.0" is cop not still possessed, up-data necessary for driver version-up is searched. Namely, "navi driver Ver. 4.0" is detected from the software name 730 after update in the distribution software list 700.

Next, "driver up-data Ver. 4.0", 920 for updating to "navi driver Ver. 4.0" is checked. From the distribution software list 700, it can be understood that the compatible apparatus with "driver up-data Ver. 4.0" 920 is either "Navi2000" or "Navi3000". It can therefore be understood that the terminal apparatus is compatible. It can then be understood that the compatible software is not required to use additional software necessary for running. It can further be understood that the software before update "navi driver Ver. 3.0" is written in the terminal information table 162, i.e., it is already possessed. From the above checks, it can be understood that "driver up-date Ver. 4.0" can be updated.

Next, "navigator up-date Ver. 4.0" 910 is again checked to confirm the software before update "navigator up-date Ver. 4.0" 910. The software before update "navigator Ver. 3.0" for "navigator up-date Ver. 4.0" 910 is not written in the terminal information table 162. Therefore, "navigator Ver. 3.0" is detected from the software name 730 after update in the distribution software list 700.

Then, "navigator up-date Ver. 3.0" 915 necessary for updating to "navigator Ver. 3.0" is checked. From the distribution software list 700, it can be understood that the compatible apparatus with "navigator up-date Ver. 3.0" 915 is either "Navi2000" or "Navi3000" and that the apparatus is compatible. Since the "driver up-data Ver. 4.0" already scheduled to install can update the present driver to the compatible software "navi driver Ver. 4.0", it can be understood that the driver software is compatible. The software name before update "navigator Ver. 2.0" of "navigator up-date Ver. 3.0" 915 is written in the terminal information table, i.e., this software is already possessed. From the above checks, it can be understood that "navigator up-date Ver. 3.0" 915 can be installed.

Since "navigator up-date Ver. 4.0" 905 can be installed as described above, "voice guide plug-in" 900 can also be installed.

Next, the installation order of relevant software will be described. The relevant software is sequentially installed from the most downstream side of software searched in a chain manner toward the reference software. In the case of "voice guide plug-in", for example, the installation order from the earliest becomes as in the following:

(1) "driver up-data Ver. 4.0" 920;
(2) "navigator up-data Ver. 3.0" 915;
(3) "navigator up-data Ver. 4.0" 910; and as the last reference software,
(4) "voice guide plug-in" 900.

Figure 10:
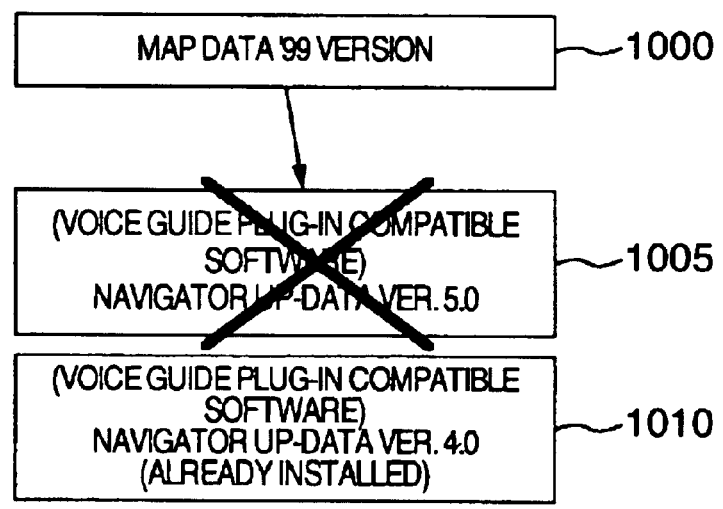
FIG. 10 is a diagram showing an extraction sequence for software relevant to the software possessed by the terminal apparatus of the first embodiment.

Similarly, consider the case wherein "map data '99 version" is installed. FIG. 10 illustrates an example of extracting relevant software necessary for installing "map data '99 version".

In installing "map data '99 version" 1000, compatible software necessary for running the "map data '99 version" 1000 is checked by referring to the compatible software name 740 in the distribution software list 700. The compatible software with "map data '99 version" is either "navigator Ver. 5.0" or "navigator Ver. 4.0". The compatible apparatus with "navigator Ver. 5.0" is "Navi3000" so that the terminal apparatus is not compatible. However, "navigator Ver. 4.0" is software scheduled to install when "voice guide plug-in" 900 is installed. Therefore, "map data '99 version" 1000 can be installed.

Relevant software necessary for installing the reference software is extracted in a chain manner as described above, and thereafter the reference software is installed from Step 500 to Step 525.

First, at Step 500 the update sequence management unit 190 checks relevant software necessary for the reference software. If it is determined at Step 505 that the relevant software is all software already scheduled to install or software already possessed, the flow advances to Step 525, whereas if there is relevant software to be installed, the flow advances to Step 510. At Step 510 the update sequence management unit 190 checks whether the relevant software group can be installed or not, by checking the compatible software 740 of the distribution software list 700 and the terminal information table 162. Next, at Step 515 it is determined whether the relevant software group can be installed or not, by extracting the relevant software in the chain manner. In this case, it is also checked whether the total data amount of the software group to be installed is smaller than the capacity of the software temporary storage unit 185, by checking the software data size 745 written in the distribution software list 700. Namely, if the software can be stored in terms of capacity, it can be installed, whereas if not, it cannot be installed. If it is determined that the software can be installed, the flow advances to Step 520, whereas if not, i.e., if the relevant software group is collected insufficiently, the flow returns to Step 425. At Step 520 the update sequence management unit 190 determines the installation order of the relevant software group necessary for installing the reference software, in the manner described earlier. As described earlier, it is assumed herein that the relevant software is sequentially installed from the most downstream side of software searched in a chain manner toward the reference software. Next, at Step 525 the update sequence management unit 190 determines the installation order of the reference software. In this example, the installation order of the reference software is set to the next order to the installation orders of the relevant software determined at Step 520. Thereafter, the flow returns to Step 425.

The flow from Step 420 to Step 525 will be described more in detail with reference to the distribution software list 700.

First, software "Internet browser Ver. 1.0" having the distribution number (1) of the distribution software list 700 is referred to, which is determined as capable of being installed and given a first installation order. Next, "3D viewer plug-in" having the distribution number (2) is referred to, which is already possessed and not installed. Next, "voice guide line plug-in" having the distribution number (3) is referred to, for which the relevant software is extracted in the chain manner as described above. Therefore, the second installation order is given to "driver up-data Ver. 4.0", the third installation order is given to "navigator up-data Ver. 3.0", the fourth installation order is given to "navigator up-data Ver. 4.0", and the fifth installation order is given to "voice guide plug-in". Next, "map data '99 version" having the distribution number (4) is referred to. Since the relevant software "navigator Ver. 4.0" is already scheduled to install, the sixth installation order is given to "map data '99 version". Next, "driver up-data Ver. 5.0" having the distribution number (5) is referred to, with which the terminal equipment is not compatible so that it is not installed. Next, "navigator up-data Ver. 5.0" having the distribution number (6) is referred to, with which the terminal equipment is not compatible so that it is not installed. Next, "driver up-data Ver. 4.0" having the distribution number (7) is referred to, which is already scheduled to install so that it is not given a new installation order. Similarly, "navigator up-data Ver. 4.0" having the distribution number (8) to be referred next is already scheduled to install so that it is not given a new installation order.

Since "navi driver Ver. 3.0" is already updated, "driver up-data Ver. 3.0" having the distribution number (9) to be referred next, is not installed. Since "navigator up-data Ver. 3.0" having the distribution number (10) to be referred next is already scheduled to install, a new installation order is not given. Since the terminal apparatus 150 has updated software for ""driver up-data Ver. 2.0" having the distribution number (11) and "navigator up-data Ver. 2.0" having the distribution number (12), these two pieces of software are not installed.

With the above process, at Step 530 the update sequence management unit 190 forms an installation sequence table writing the installation sequence. FIG. 11 shows an installation sequence table. The installation sequence table 1100 has an installation order 1105 and a name 1110 of software to be installed. The contents of the installation sequence table 1100 for the distribution software list 700 are:

1st: "Internet browser Ver. 1.0"

2nd: "driver up-data Ver. 4.0"

3rd: "navigator up-data Ver. 3.0"

4th: "navigator up-data Ver. 4.0"

5th: "sound guide plug-in"

6th: "map data 99' version"

This installation sequence table is managed by the update sequence management unit 190.

Next, a software distribution process at the station 100 and a software reception process at the terminal apparatus 150 will be described. First, the process at the station 100 will be described.

At Step 315 the distribution software encryption unit 110 enciphers a distribution software group by using a cipher key in order for the third party not to tap the software. The cipher key information necessary for encryption is informed in advance to a user of the terminal apparatus 150. A user inputs in advance this cipher key information to the input unit 175 of the terminal apparatus 150. In this way, the terminal apparatus 150 can decipher the enciphered software. Next, at Step 320 the distribution side communication unit 115 distributes the software group enciphered at Step 315.

Next, the process at the terminal apparatus 150 will be described.

In the process from Step 600 to Step 620, a software group necessary for installation is received from software distributed from the station 100, in accordance with the installation sequence table 1100, and deciphered.

At Step 600 the terminal side control unit 180 determines from the received distribution software list whether the distribution end time has lapsed, i.e., whether all software has been transmitted. If transmitted, the flow advances to Step 655 whereat the display unit 197 displays a message indicating "distribution end" to thereafter follow Step 665. If not transmitted, the flow advances to Step 605.

At Step 605 the terminal side communication unit 155 receives the software distributed from the station 100. Next, at Step 610 the update sequence management unit 190 determines whether the software received at Step 605 is the software written in the installation sequence table. If so, the flow advances to Step 615, whereas if not, the flow returns to Step 600.

At Step 615 the decryption unit 170 deciphers the software written in the received installation sequence table, and the deciphered software is temporarily stored in the software temporary storage unit 185. Next, at Step 620 the terminal side control unit 180 checks whether all software necessary for installation written in the installation sequence table has been received. If not, the flow returns to Step 600, whereas if received, the flow advances to Step 625.

In the process from Step 625 to Step 650, the navigation unit 195 installs the received software in the navigation unit 195 in accordance with the installation sequence table.

At Step 625 the software possessed by the navigation unit 195 before the installation is backed up in the software temporary storage unit 185 in order for the software recovery unit 165 to recover the state of software before the installation in case the installation is failed.

Next, at Step 630 the software update unit 160 installs the software received by the process from Step 600 to Step 620 in the navigation unit 195, in accordance with the installation order written in the installation sequence table.

Next, at Step 635 the update sequence management unit 190 determines whether the software installation at Step 630 has succeeded. If succeeded, the flow advances to Step 650 whereat the display unit 197 displays a message "update success" to thereafter follow Step 660. If the installation failed, the flow advances to Step 640.

At Step 640, in order to recover the state of the software in the navigation unit 195 before the installation, the software recovery unit 165 installs the software before update backed up in the software temporary storage unit 185, in the navigation unit 195. At Step 645 the display unit 197 displays a message "update failure" to thereafter follow Step 660.

At Step 660 the terminal side communication unit 155 transmits the updated contents of the software of the navigation unit 195, i.e., the software name and version, to the station 100 to thereafter follow Step 665. On the side of the station 100, at Step 325 the distribution side communication unit 115 receives the updated contents transmitted from the terminal apparatus 150. The updated contents are managed by the update contents management unit 130. In this manner, the updated contents at each terminal apparatus can be recognized.

At Step 665 the terminal side control unit 150 enters the standby mode in order to suppress the power consumption at the terminal apparatus 150, to thereafter return to Step 405.

In this embodiment, software is distributed by using the satellite. Software may be distributed by using a digital ground wave broadcasting station. In this case, portable telephones, PHSes or the like are used for communications between terminal apparatuses and the digital ground wave broadcasting station.

As described above, during automatic update of a software group at each terminal apparatus, a plurality piece of relevant software can be updated without any dependency problem.

Figure 12:
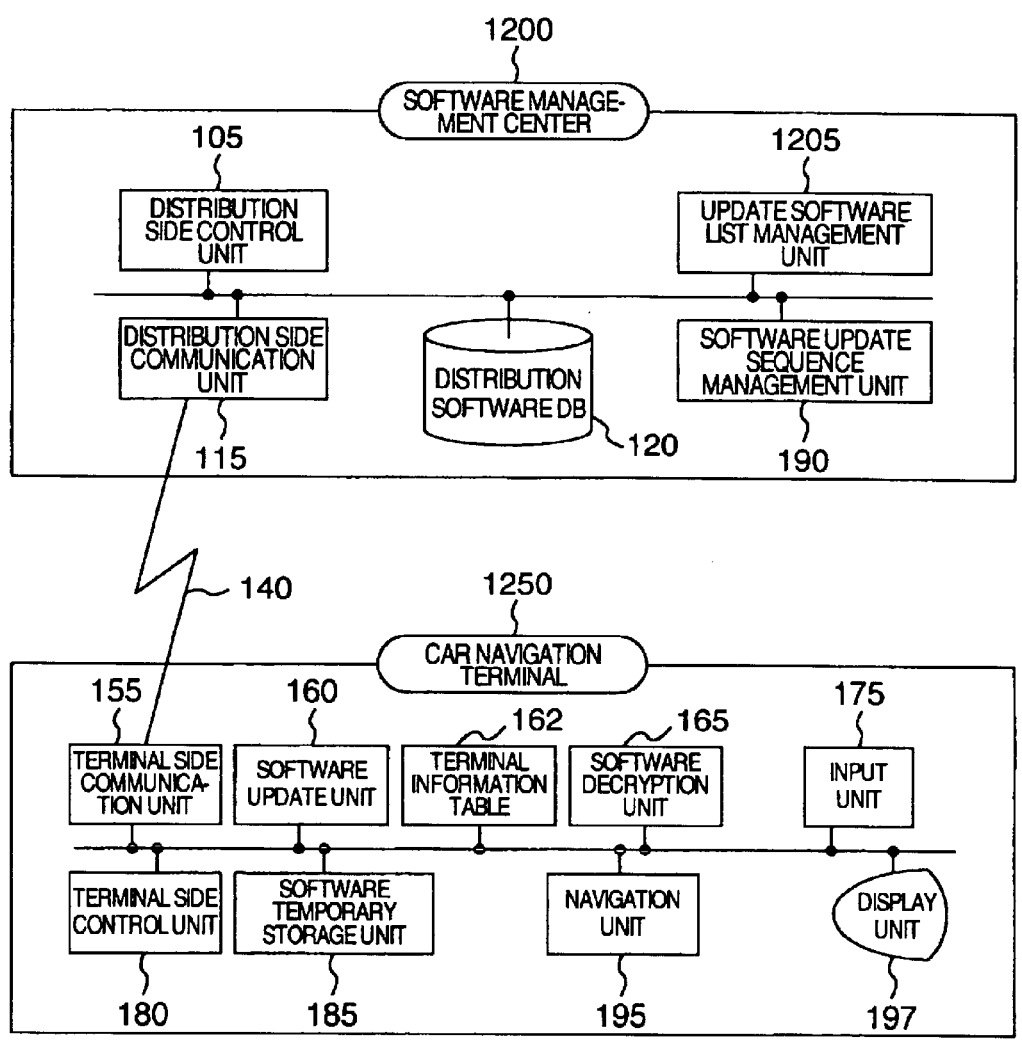
FIG. 12 is a diagram showing the structure of a system according to a second embodiment of the invention.

Next, the second embodiment of the invention will be described with reference to FIGS. 12 to 18. FIG. 12 shows the structure of a system according to the second embodiment of the invention. In this embodiment, upon an update information transmission request from a user, information on hardware and software of a terminal apparatus or car navigation terminal apparatus in a vehicle is transmitted to a software management center via a satellite distribution system capable of transmitting and receiving radio waves in the zenith direction. In accordance with the information on hardware and software of the car navigation terminal apparatus, the software management center selects a software group to be updated and calculates an installation order or update sequence in order to ensure the installation without any dependency problem. The software management center transmits the selected software group and the calculated update sequence to the car navigation terminal apparatus via the satellite distribution system capable of transmitting and receiving radio waves in the zenith direction. The car navigation terminal apparatus temporarily stores the received information. Upon an update request from the user, the software is updated by using the temporarily stored software and update sequence.

This system has a software management center 1200 and a car navigation terminal apparatus 1250. In accordance with information on hardware and software of the car navigation terminal apparatus 1250 received from the apparatus, the software management center 1200 selects a software group necessary for updating the software of the car navigation terminal apparatus 1250 and calculates an update sequence of the software group to ensure installation without any dependence problem. Thereafter, the software management center 1200 transmits the selected software group and calculated update sequence. The terminal apparatus 1250 transmits information on its hardware and software to the software management center 1200 and receives the software group necessary for update and the update sequence sent from the software management center 1200 to update the software of the terminal apparatus 1250.

The software management center 1200 has: a distribution side communication unit 115 for transmitting software used for updating software of the terminal apparatus 1250 and an update sequence table for updating the software and for receiving the name and version of hardware and software of the terminal apparatus 1250 transmitted therefrom; an update software database 120 for storing software necessary for updating the software of the terminal apparatus 1250; an update software management unit 1205 for managing an update software list of the software stored in the update software database 120; an update sequence management unit 190 for selecting a necessary software group in accordance with the update software list of the software stored in the update software database 120 and managing the update sequence of the selected software group; and a distribution side control unit 105 for issuing a transmission command to the distribution side communication unit 115 and managing the whole control flow.

The update software list is generally the same as the distribution software list of the first embodiment. The different point is that the item "software distribution time" in the distribution software list is excluded. The update software list writes the following items:

(1) a distribution number sequentially and uniquely assigned to each piece of software, starting from "1";

(2) a name of software;

(3) an installation type indicating whether the software is update software or new software;

(4) a name (including a version) of software updated by distribution software (up-data);

(5) a name (including a version) of software to be updated by distribution software (up-data); and (6) an apparatus compatible with installation software and compatible software.

The terminal apparatus 1250 has: a navigation unit 195 for searching necessary map information, displaying a map, and displaying a present location of the user; a software update unit 160 for updating software of the navigation unit 195; a terminal side communication unit 155 for receiving software and an update sequence list transmitted from the software management center 1250; a software temporary storage unit 185 for temporarily storing software received at the terminal side communication unit 155; a software decryption unit 165 for recovering the original software of the navigation unit 195 once updated by the software update unit 160; an input unit 175 for manipulating a button for transmitting a software update request to the software management center 1200 and manipulating a button for starting software update; a display unit 197 for displaying map information or search information; and a terminal side control unit 180 for issuing a software update command to the software update unit 160, and issuing a software recovery command to the software recovery unit 170.

Figure 16:
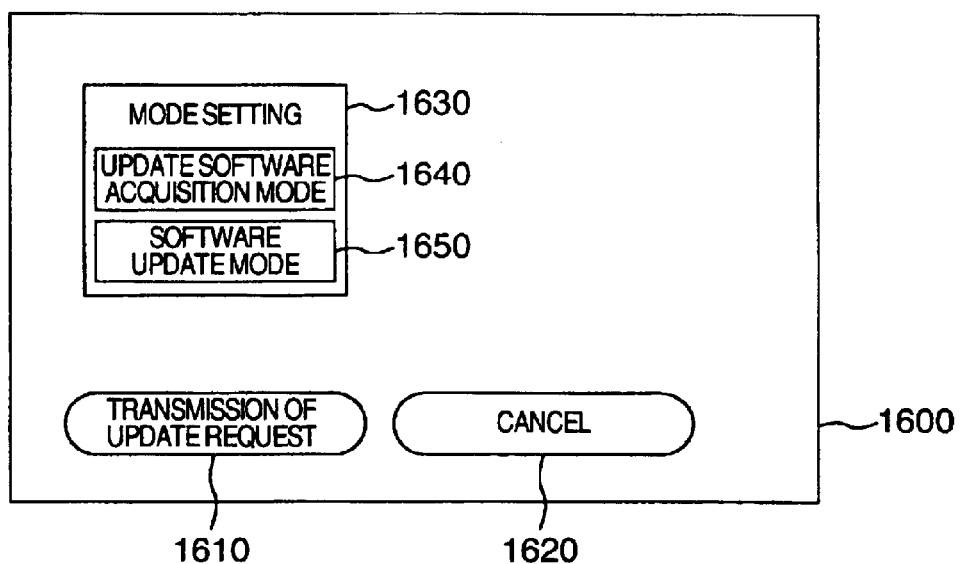
FIG. 16 is a display window used in an "update software acquisition model" at the terminal apparatus of the second embodiment.
Figure 17:
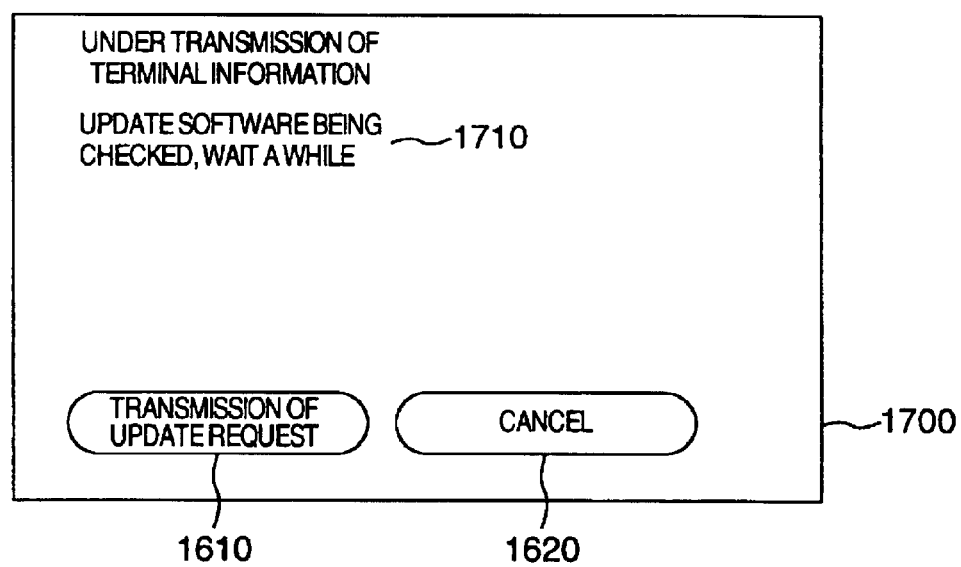
FIG. 17 is a display window used in an "update software acquisition model" at the terminal apparatus of the second embodiment.
Figure 18:
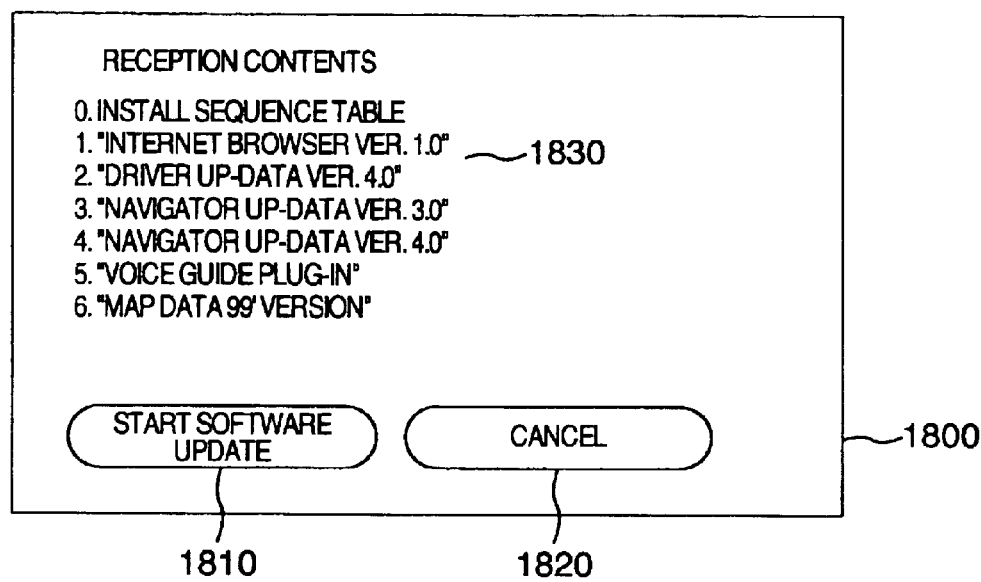
FIG. 18 is a display window used in an "update software acquisition mode" at the terminal apparatus of the second embodiment.

FIGS. 16 to 18 show display windows of the display unit 197 used for a software update work. The software update work includes an "update software acquisition mode" and a "software update mode". In the "update software acquisition mode", information on hardware and software of the terminal apparatus 1250 is transmitted to the software management center 1200, and a software group necessary for the update and an update sequence table are received from the software management center 1200. In the "software update mode", the software of the terminal apparatus 1250 is updated. FIG. 16 is a display window first displayed when an update request is transmitted to the software management center 1200 in the "update software acquisition mode". FIG. 17 is a display window displayed while the update request is transmitted in the "update software acquisition mode", i.e., while the software management center 1200 selects a necessary software group and calculates an update sequence. FIG. 18 is a display window displayed when software is updated in the "software update mode".

Figure 13:
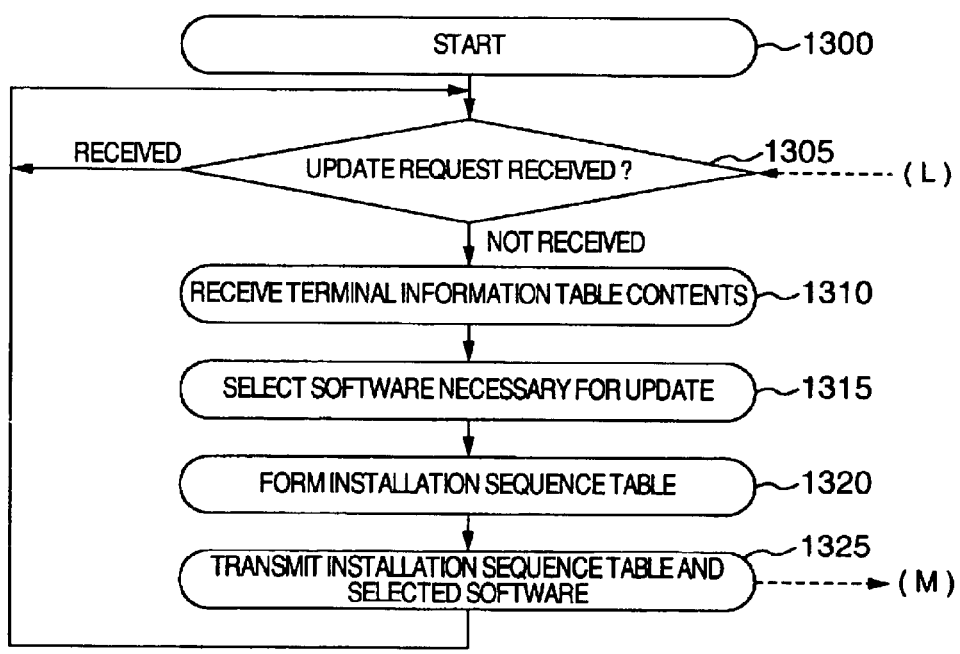
FIG. 13 is a flow chart illustrating the operation to be executed by a software management center of the second embodiment.
Figure 14:
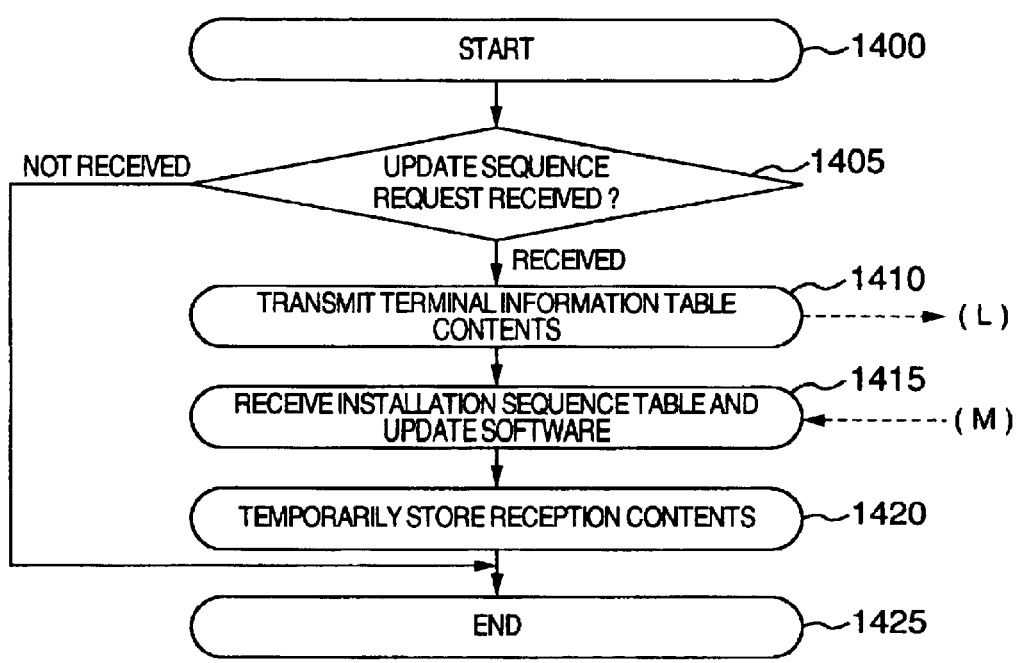
FIG. 14 is a flow chart illustrating the operation to be executed by a terminal apparatus of the second embodiment.
Figure 15:
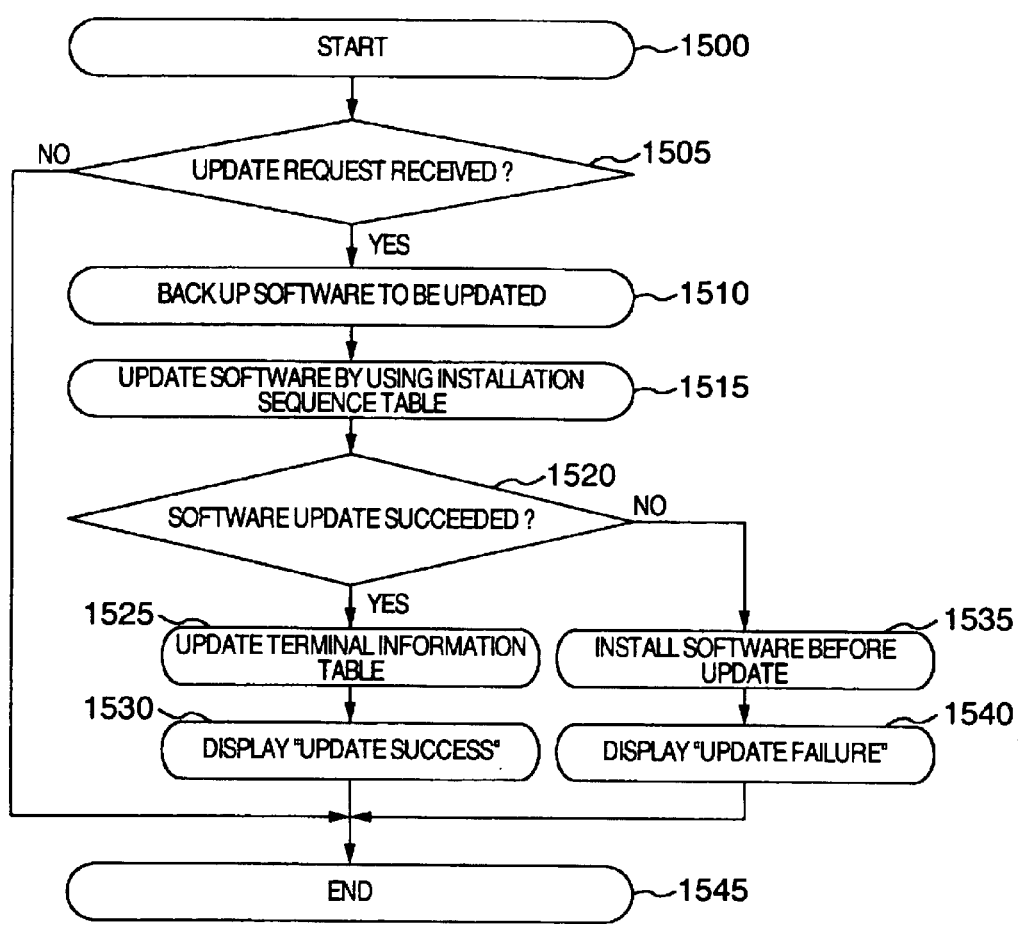
FIG. 15 is a flow chart illustrating the operation to be executed by the terminal apparatus of the second embodiment.

FIGS. 13 to 15 are flow charts illustrating the operation of the second embodiment of the invention. FIG. 13 is a flow chart illustrating the operation to be executed by the software management center 1250. FIG. 14 is a flow chart illustrating the operation to be executed by the terminal apparatus 1250 during the "update software acquisition mode". FIG. 15 is a flow chart illustrating the operation to be executed by the terminal apparatus 1250 during the "software update mode".

When a user wishes to update software, the user makes the input unit 175 display the display window 1600 for the "update software acquisition mode". In order to display the display window 1600, the user makes the input unit 175 display a mode setting dialog 1630 to be used for setting a mode, and in this state, an update software acquisition mode item 1640 is selected. In this manner, the display window 1600 is displayed.

The display window 1600 has an update request button 1610 for transmitting a software update request to the software management center 1600 and a cancel button 1620 for cancelling the software update process. When the user designates either the update request button 1610 or cancel button 1620, the flow starts at Step 1400.

At Step 1400 a start process of starting the "update software acquisition mode" for the terminal apparatus is executed. Next, at Step 1405 it is determined which one of the update request button 1610 and cancel button 1620 is designated. If the update request button 1610 is designated, the flow advances to step 1410, whereas if the cancel button 1620 is designated, the flow advances to Step 1425. At Step 1410 the terminal communication unit 155 transmits the names and versions of hardware and software possessed by the terminal apparatus and written in the terminal information table 162, to the software management center 1200 via the satellite capable of transmitting and receiving radio waves in the zenith direction. By using such a satellite, a user can transmit necessary information even in an urban district where influence of buildings is susceptible and in a rural district where a dead zone of portable telephones is broad, so long as the user can see the sky.

On the side of the software management center 1200, reception of information from the terminal apparatus is prepared at Step 1300. At Step 1305 the distribution side communication unit 115 continues a polling operation until the software update request is issued from a terminal apparatus. If an update request is received at Step 1305, the flow advances to Step 1310 whereat the distribution side communication unit 115 receives the names and versions of hardware and software written in the terminal information table 162 and transmitted from the terminal apparatus 1250.

Next, at Steps 1315 and 1320, in accordance with the update software list managed by the update software management unit 1205, the update sequence management unit 190 selects a software group necessary for updating the software of the terminal apparatus 1250 and calculates an update sequence to ensure the update by the selected software group without any dependence problem, i.e., calculates an installation sequence table. The process of selecting a software group and the process of calculating the update sequence are the same as those corresponding processes of the first embodiment (from Step 420 to Step 530). The update software list management unit 1205 updates the update software list each time the contents of the distribution software database 120 are updated.

Next, at Step 1325 the distribution side communication unit 115 transmits the software group necessary for update selected by the update sequence management unit 190 and the install sequence table writing the update sequence of the selected software group, to the terminal apparatus 1250 via the satellite capable of transmitting and receiving radio waves in the zenith direction. Thereafter, the flow returns to Step 1305 to continue the polling operation for a new update request.

Next, on the side of the terminal apparatus 1250, at Step 1415 the terminal side communication unit 155 receives the update software group and installation sequence table necessary for updating the software of the terminal apparatus 1250. During the process from Step 1410 to Step 1415, the display window 1700 is displayed on the display unit 197, the display window indicating the state of under transmission of an update request (i.e., during the process of selecting the necessary software group and the process of calculating the update sequence, respectively by the software management center 1200). A message indicating "under transmission" is displayed in the display window 1700.

Next, at Step 1420 the received update software group and installation sequence table are stored in the software temporary storage unit 185. At Step 1425 the terminal side control unit 180 executes an "update software acquisition mode" end process.

After the terminal side control unit 180 executes an "update software acquisition mode" end process, the terminal side control unit 180 starts the process for the "software update mode" and the display window 1800 is displayed on the display unit 197.

The display window 1800 displays the reception contents (contents 1830 stored in the software temporary storage unit 185) and has a software update start button 1810 for starting the update of the software of the terminal apparatus 1250 and a cancel button 1820 for cancelling the update of the software.

The start process for the "software update mode" by the terminal side control unit 180 is executed at Step 1500. Next, at Step 1505 it is determined which one of the software update button 1810 and cancel button 1820 was designated by the user by using the input unit 175. If the software update start button 1810 is designated, the flow advances to Step 1510, whereas the cancel button 1820 is designated, the flow advances to Step 1545.

If it is determined at Step 1505 that the cancel button was designated, the update process is terminated and an end process is executed at Step 1545. However, a user may display the mode setting dialog 1630 and select the "software update mode", 1650 by using the input unit 175, to call again the installation process. In this case, the received software group and installation sequence table stored in the software temporary storage unit 185 are used for updating the software of the terminal apparatus 1250. In this manner, either the case wherein the user wishes to use the car navigation terminal apparatus immediately after the reception end or the case wherein the user wishes not to update the software immediately after the reception end, can be dealt with.

At Step 1510 the software possessed by the navigation unit 195 before the installation is backed up in the software temporary storage unit 185 in order for the software recovery unit 165 to recover the state of software before the installation in case the installation is failed.

Next, at Step 1515 the software update unit 160 installs the software group stored in the software temporary storage unit 185, in the navigation unit 195, in accordance with the installation sequence in the installation sequence table stored in the software temporary storage unit 185.

Next, at Step 1520 the software update unit 160 determines whether the software update at Step 1515 has succeeded. If succeeded, the flow advances to Step 1525, whereas if failed, the flow advances to Step 1535.

If succeeded, at Step 1525 the software name and version of the updated software are written in the terminal information table 162. At Step 1530 a message "update success" is displayed on the display unit 197.

If failed, at Step 1535, in order to recover the state of the software in the navigation unit 195 before the update, the software recovery unit 165 installs the software before update backed up in the software temporary storage unit 185, in the navigation unit 195. At Step 1540 the display unit 197 displays a message "update failure" to thereafter follow Step 1545.

At Step 1545 the terminal side control unit 180 executes an end process for the "software update mode".

As described above, during automatic update of a software group at each terminal apparatus, a plurality piece of relevant software can be updated without any dependency problem. Further, the software management center is provided with the update sequence management unit so that the circuit of the terminal apparatus can be simplified. Since the software temporary storage unit for temporarily storing a software group necessary for the update is provided, a user can update the software at any time the user desires.

According to the first and second embodiments, an update sequence management means is provided for extracting up-data in a chain manner necessary for updating software and managing the update sequence of the extracted up-data. Therefore, a plurality piece of relevant software can be updated without any dependency problem.

Updating is possible even if a user has no highly sophisticated technical knowledge.

Even if there occurs any trouble during updating, a user without technical knowledge can recover the original state, which provides a high reliability.

An apparatus or system easy to use can be provided.

What is claimed is:

1. A terminal apparatus comprising:
   a reception unit for receiving a data group or a program group distributed from a satellite or a ground distribution system; and
   an update sequence management unit for searching data or a program of the terminal apparatus to be updated and data or a program necessary for updating the data or the program of the terminal apparatus, from the data group or the program group, determining an update sequence of the searched program or data, and updating the program or data of the terminal apparatus in accordance with the determined update sequence, and wherein said update sequence management unit forms an installation sequence table in accordance with a distribution software list, the distribution software list having been downloaded in advance and describing therein a software name of a program or data of the distributed data group or program group, and compatible software necessary for operation of the program or data, and the installation sequence table describing therein the program or data of the terminal apparatus to be updated, software necessary in a chain manner for updating the program or data, and the update sequence of the software.

2. A terminal apparatus according to claim 1, further comprising an operation check unit for checking an operation of the software after update and a terminal side transmitting unit for transmitting an operation check result.

3. A terminal apparatus according to claim 1, wherein said reception unit receives information distributed along a zenith direction.

4. A vehicle information terminal for automatically updating application software, map data or system software of the vehicle information terminal, by using the terminal apparatus recited in claim 1.

* * * * *